3,378,466
RECOVERY OF AROMATIC FORMALDEHYDE RESINS BY STEAM SPARGING WITH AN ALKALI AND VACUUM DISTILLATION
Bruce R. Coltharp, Raymond L. Heinrich, Ira G. Thompson, and Charles L. Thorpe, Baytown, Tex., assignors to Esso Research and Engineering Company, a corporation of Delaware
Filed June 14, 1966, Ser. No. 557,520
12 Claims. (Cl. 203—33)

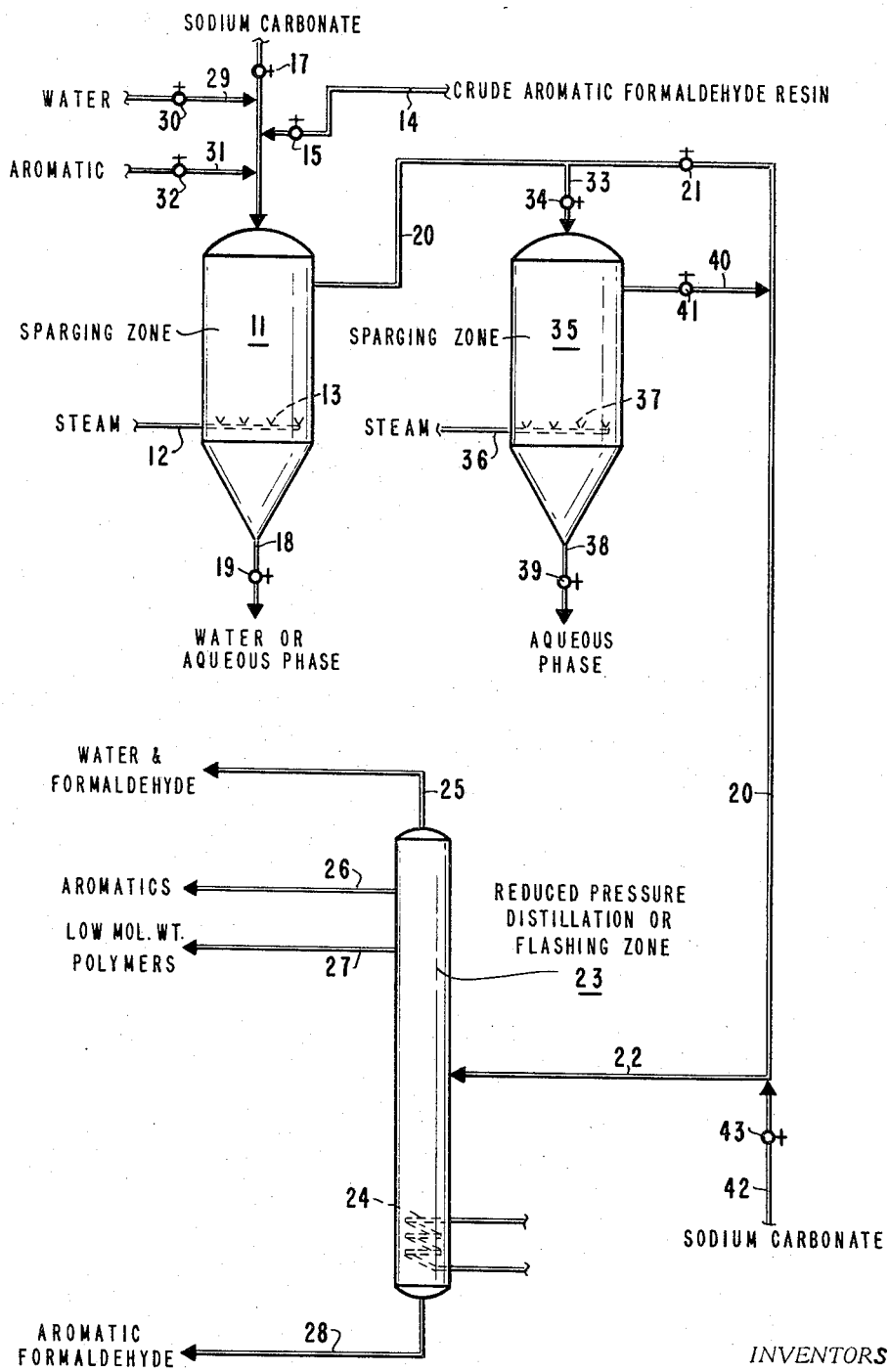

The present invention is directed to recovery of aromatic formaldehyde resins. More particularly, the invention is concerned with recovery of aromatic formaldehyde resins from the crude reaction product without substantial loss of color and oxygen content. In its more specific aspects, the invention is concerned with the recovery of aromatic formaldehyde resins without deterioration of color and lowering of oxygen content of the resin products.

The present invention may be briefly described as a method of recovering aromatic formaldehyde resins from a crude reaction product containing the resins, unreacted aromatics, low-boiling condensation products, unreacted formaldehyde and paraformaldehyde, water, mineral or organic acid catalyst, and the like. In the practice of the present invention, steam is sparged into the crude reaction product for a sufficient period of time to form an aqueous phase and an oil phase which are separated from each other. The oil phase is distilled under subatmospheric pressure conditions to obtain a resin product as a bottoms fraction and unreacted aromatics, low molecular weight polymers, free formaldehyde and water as overhead. By the steam sparging operation and the subatmospheric pressure distillation, it is possible to minimize loss of color and oxygen content.

It is particularly advantageous that the distillation be conducted under flashing conditions at reduced pressures.

The loss of color and oxygen content is particularly minimized by conducting the steam sparging operation in the presence of an alkaline reagent such as sodium carbonate and the like. The steam sparging operation may also be conducted in the presence of added liquid water and added aromatic hydrocarbons.

A second steam sparging operation may be employed and the reduced pressure distillation or flash distillation may be conducted in the presence of an alkaline reagent such as sodium carbonate. In any event, the steam sparging operation and the reduced pressure distillation allow the recovery of resin products of improved color and oxygen content.

The aromatic formaldehyde resins may suitably have an oxygen content within the range of from about 4% to 25%, preferably from about 8% to about 18% by weight, and these aromatic formaldehyde resins may be produced by reacting an aromatic hydrocarbon such as toluene, xylenes, trimethylbenzene, tetramethylbenzene, and other alkyl-substituted aromatic hydrocarbons such as those having one or more alkyl substituents on a single or condensed ring. The alkyl substitutents may have from one to fifteen carbon atoms.

The formaldehyde feedstock is suitably formaldehyde, formalin, paraformaldehyde or trioxane.

An acid catalyst is suitably used, and it may be sulfuric acid in an aqueous solution, formic acid, trifluoroacetic acid, or sulfonic acids of the aromatic compounds illustrated. Mixtures of the several acid catalysts may also be used, including mixtures of sulfuric and acetic acids.

The relative proportions of aromatic hydrocarbon, formaldehyde, and acid should be employed to yield an acid-oil weight ratio from about 0.2 to about 10.0 and an aromatic hydrocarbon-to-formaldehyde mol ratio from 0.5 to about 5.0.

Residence times of about 1.0 to about 10 hours may be used in reacting the formaldehyde and the aromatic hydrocarbon in batch reactions while residence times of 0.02 to 2.0 hours may be used in continuous flow reactions. Temperatures may range from about 70° to about 250° F. while pressures are employed sufficient to maintain the reactants in a liquid phase.

Under the foregoing several conditions, a crude reaction product is obtain such as employed in the practice of the present invention.

The alkaline reagent employed in the practice of the present invention is preferably solid sodium carbonate or sodium carbonate as a 2% to 12% by weight solution in water. However, other alkaline reagents such as but not limited to sodium hydroxide, sodium borate, or other alkali bases or basic salts may be employed.

The added aromatic hydrocarbons which may be used in the practice of the present invention may be the same aromatic hydrocarbons from which the aromatic formaldehyde resins are produced.

The flash distillation operations may be conducted at a residence time of about 0.05 to about 5 minutes, a pressure of about 0.5 to about 50 mm. Hg, preferably at 5 mm. to 15 mm. Hg, and a temperature in the range from 350° F. to 550° F., preferably about 400° to about 450° F. The distillation under subatmospheric pressure conditions other than flash distillation may include a residence time of about 5 to about 360 min., a temperature within the range from about 250° to about 550° F., and a pressure within the range from about 5 to about 20 mm. Hg.

The steam sparging step may be conducted for a sufficient period of time to raise the temperature of the crude reaction product to at least 210° F. Temperatures from about 180° to about 230° F. may be used. The crude product may be sparged with steam for a period of time ranging from about 5 to about 120 min. Under certain conditions, it may be necessary to repeat the steam sparging operation either in the presence or absence of the alkaline reagent such as sodium carbonate. Alternately, alkaline reagent may be used only in the first steam sparging operation. The same holds true for the addition of water and aromatic hydrocarbons.

When reduced pressure distillation other than flash distillation is used, it may be desirable to add an alkaline reagent to the material being distilled under reduced pressure.

There are several problems in recovering resinous products of aromatic formaldehyde condensation reactions. The resinous products contain in addition to unreacted aromatic hydrocarbons and low molecular weight materials certain by-products which cause degradation of the resinous products through loss of color and oxygen content. These by-products have been identified to include aromatic sulfonic acids. Heretofore, the aromatic formaldehyde resins have been recovered by addition of sodium bicarbonate or other material during vacuum distillation to recover the resins. However, the added basic materials, even though filtered out of the resin product bottoms, left troublesome residues which gave the product an undesirably high ash content. Moreover, the long residence time required for vacuum distillation for removal of unreacted aromatics and low-boiling condensation products caused degradation of the resin product such as by loss of color and lowered oxygen content.

Moreover, the desired product frequently is extremely viscous and in certain cases a product which is solid at ambient temperatures is obtained. These products form very stable emulsions with the aqueous sulfuric acid catalyst phase and are stabilized in some degree by the aromatic sulfonic acids which are formed as by-products in the process.

In accordance with the present invention, these difficulties and disadvantages of the prior art are alleviated or obviated by employing a combination of steam sparging and reduced pressure distillation to recover the resin product.

The present invention will be further illustrated by reference to the drawing in which the single figure represents a flow diagram of a preferred mode and embodiment.

Referring now to the drawing, numeral 11 represents a sparging zone into which steam is introduced by line 12 through a suitable sparging device 13. The crude aromatic formaldehyde resin produced as described before is introduced into the system by line 14, controlled by valve 15, by way of line 16. By manipulating valve 17 in line 16, a 10% by weight solution of sodium carbonate may be introduced with the crude resin. Steam is sparged into the sparging zone 11 for a period of time within the range of 10 to 120 min. The temperature in the sparging zone is approximately 210° F. Thereafter, the material in zone 11 is allowed to separate into an oil phase and a water phase, with the water phase being discharged by line 18, controlled by valve 19, for recovery as desired of acid, formaldehyde, and other materials contained therein. The oil phase is discharged by line 20, controlled by valve 21, and introduced by line 22 into a reduced pressure distillation or flashing zone 23, which is provided with temperature adjusting means illustrated by steam coil 24. In reduced pressure distillation or flashing zone 23, conditions are adjusted to take overhead a stream by line 25 containing water and formaldehyde, a stream by line 26 containing unreacted aromatics, and a stream by line 27 containing low molecular weight polymers, with the desired aromatic formaldehyde resin of improved color and oxygen content being recovered by line 28.

In the practice of the present invention, it may be desirable sometimes not to introduce sodium carbonate and, under these conditions, steam may be introduced into line 16 by line 29, controlled by valve 30, and added aromatic hydrocarbons may be introduced by line 31, controlled by valve 32. When these operations are conducted, valve 21 may be closed and the oil phase discharged by branch line 33, controlled by valve 34, into a second sparging zone 35 into which steam is introduced by line 36 and sparging means 37. The sparging operation in zone 35 may continue for a period of time within the range from about 10 min. to about 120 min. until a temperature of about 210° F. is achieved. Thereafter, the second oil phase and a second aqueous phase are separated with the aqueous phase being discharged by line 38, controlled by valve 39, for recovery of water and any acid which might separate. The second oil phase is withdrawn by line 41, controlled by valve 40, and discharged into line 21 and then line 22 for introduction into reduced pressure and distillation as flashing zone 23. Under these conditions, it may be desirable to introduce an alkaline reagent such as 10% by weight solution of sodium carbonate by line 42, controlled by valve 43. When the second sparging zone is used and water and aromatic hydrocarbons are added, the separation in zone 23 may be reduced pressure distillation to obtain fractions through lines 25, 26 and 27, as has been described, and aromatic formaldehyde resins by way of line 28.

It is contemplated that one or a plurality of sparging operations may be conducted by increasing the number of sparging operations. The color and oxygen content of the product may be further increased and other materials recovered for reuse in the process as may be desired.

In order to illustrate the invention further, a crude resinous product was made by charging 8-9 parts per hour of xylenes (which contained about 62.5% by weight of metaxylene, 13% paraxylene, 11% orthoxylene and 13.5% ethylbenzene) and 4 parts per hour of paraformaldehyde (91% by weight formaldehyde) to a 10 volume reactor containing 4 volumes of liquid phase reactants of roughly 50 parts oil phase and 50 parts acid phase (about 40 weight percent sulfuric acid, 14 weight percent formaldehyde, and the balance water). The reactant temperature was 210° to 214° F., and pressure was 1.5 p.s.i.g. This product was placed in a sparging zone containing 35 volumes of the crude product to which was added 3 volumes of water and from about 0.8 to about 1.5 parts of sodium carbonate per 100 parts water. Steam at 212° F. and 15 p.s.i.g. was sparged into the bottom of the sparging vessel through a stainless steel dip pipe until the temperature of the vessel had risen from an initial 80° to 210° F. Sparging required about 15-20 minutes. After the contents of the sparging vessel settled for 30 to 50 minutes, an aqueous phase of about 5-7 volumes was removed. The steam sparging was repeated twice but without addition of more sodium carbonate. After the third and last sparging, the crude reaction product was allowed to settle for several hours, substantially all of the aqueous phase settling out on said prolonged standing.

The oil phase was then rapidly flashed to obtain a resin product as bottoms and unreacted aromatics and low molecular weight polymers as an overhead fraction. Free formaldehyde, water, and other low-boiling materials were also removed as part of the overhead. The following yields and inspections were obtained from distillation of the steam sparged product, as has been described. In one case, vacuum distillation was employed, and in the other vacuum flashing. The results of these operations, together with the conditions, are presented in Table I.

TABLE I

| | Batch Vacuum Distillation, about 2 hours residence time, 2 mm. Hg pressure, about 550° F. max. bots. temperature | Continuous Vacuum Flashing, Thin film, about 1 to 5 min. residence time, 15 mm. Hg pressure, about 400°-450° F. |
|---|---|---|
| Resin Product Yield Wt. percent of crude product | 63.6 | 63.0 |
| Color | 5 | 4+ |
| Viscosity, SSU, 210° F | 1,820 | 2,075 |
| Elemental Analysis: | | |
| Carbon | 80.18 | 79.61 |
| Hydrogen | 8.40 | 8.28 |
| Oxygen (by difference) | 11.42 | 12.11 |

It will be seen from the foregoing comparison that good quality products with high oxygen content and color are obtained.

When other runs were made without steam sparging and the products distilled under reduced pressure, a darkened thermoset bottoms product was obtained.

In other operations, 1359 parts of xylene (12.8 mols, analysis 62.5% of metaxylene, 13% paraxylene, 11% orthoxylene and 13.5% ethylbenzene) and 634 parts of paraformaldehyde (19.2 mols, analysis 91% by weight of formaldehyde) were charged to a stirred reactor with a reflux condenser and brought to a temperature of 204° F. Sulfuric acid of 75% by weight concentration in water in the amount of 400 parts was added in seven equal parts at 30 minute intervals. The temperature of the reactants rose to 233° F. at the end of 3½ hours, at which time all of the acid had been added. The temperature was maintained at 233° F. for two additional hours with continued stirring. The reaction mixture on cooling to 180° F. did not separate into phases, and at 80° F. the emulsion of the two phases was too viscous to remove from the reactor. This resin product was then recovered in accordance with the present invention. To about 2400 parts of emulsion there was added 172 parts of xylene having the same composition as the feed and 500 parts of water, following which 210° to 220° F. steam was sparged into the reactor. After introducing and condensing about 200 to 400 parts of steam, the temperature of the mixture was increased to 210° F. The time for this operation was about 20 min. Sparging was stopped, and the mixture then separated into two layers. The acid and water layer was drawn off, and then the oil layer was steam sparged three additional times without addition of more water or xylenes, removing the acid containing aqueous layer after settling at about 180° to 210° F. each time.

After the repeated steam sparging operations, 20 parts of solid sodium carbonate were added to the remaining mixture, and steam was again sparged into the oil phase until about 200 to 400 parts steam had been introduced. The aqueous phase was settled at about 180° to 210° F. and removed. The sodium carbonate treatment was repeated a second time, and then the sparging was repeated twice without addition of additional sodium carbonate.

The oil product was distilled under reduced pressure of 20 mm. Hg to recover a resin of the following properties:

TABLE II

| | |
|---|---|
| Oxygen, wt. percent | 8.1 |
| Viscosity, SSU, 210° F. | 64,000 |
| Softening point, ° F. (ring and ball) | 165 |
| Color, varnish | 10 |

The above-recovered resin is the highest molecular weight xylene formaldehyde resin which has been prepared without degradation; that is, loss of oxygen content and color during processing.

The same charge material and procedure as used in the immediately preceding operation was followed except 500 parts of 60 weight percent sulfuric acid was added instead of 400 parts of 75 weight percent, and reaction time totaled 11 hours. The reaction temperature rose from 205° F. to 233° F. after 7 hours and was held at 233° F. for 4 additional hours.

Again an emulsion was formed which did not settle out either hot or cold. Addition of 1000 parts of water to the approximately 2500 parts of reactants and heating with either vigorous or mild agitation did not break the emulsion. The emulsion was then broken by steam sparging in accordance with the present invention.

In this operation, about 200 to about 400 parts of steam of each in four increments was introduced, the water and acid phase being withdrawn each time after settling at 180° to 200° F.

The oil phase was distilled under reduced pressure adding 7.5 grams sodium bicarbonate per liter of oil. The product deteriorated during distillation, and the oxygen content dropped to 5.3 weight percent. These results show that under these conditions the presence of an alkaline reagent during steam sparging is desirable since another portion of the remaining oil product was subjected to steam sparging in the presence of sodium carbonate, and on distillation under reduced pressure there was recovered a resin of the following inspections:

TABLE III

| | |
|---|---|
| Oxygen, wt. percent | 8.9 |
| Viscosity, SSU, 210° F. | 45,000 |
| Softening point, ° F. (ring and ball) | 154 |
| Color, varnish | 9 |

This is a very high molecular weight resin as indicated by viscosity and has quite desirable properties.

The reduced pressure distillations in the immediately preceding examples were carried out at 50 mm. absolute at 327° F. (corrected to 760 mm.) overhead temperature, then at 20 mm. to 686° F. (corrected to 760 mm.). The maximum bottoms temperatures were about 525° to 550° F.

From the foregoing examples, it will be seen that it is possible to obtain products of improved color and oxygen content by combination of steam sparging and reduced pressure distillation.

The nature and objects of the present invention having been completely described and illustrated, and the best mode contemplated set forth, what we wish to claim as new and useful and secure by Letters Patent is:

1. A method of recovering aromatic formaldehyde resins from a crude reaction product containing said resins, unreacted aromatics and low boiling condensation products which comprises the steps of:
   introducing steam into said crude reaction product for a period of time sufficient to form an aqueous acid phase and an oil phase;
   separating said phases; and
   distilling said oil phase under subatmospheric pressure conditions to obtain a resin product as a bottoms fraction and unreacted aromatics, low molecular weight polymers, free formaldehyde and water as overhead;
   whereby loss of color and oxygen content of said resin product during recovery is minimized.

2. A method in accordance with claim 1 in which the steam is introduced in the presence of an alkaline reagent.

3. A method in accordance with claim 2 in which the alkaline reagent is sodium carbonate.

4. A method in accordance with claim 1 in which the steam is introduced in the presence of an added aromatic hydrocarbon.

5. A method in accordance with claim 4 in which the unreacted and added aromatic hydrocarbons are xylenes.

6. A method in accordance with claim 1 in which the oil phase has steam added to it for a period of time sufficient to form a second aqueous phase and a second oil phase, and said second oil phase is separated and subjected to said distillation under reduced pressure.

7. A method in accordance with claim 6 in which the first steaming step is conducted in the presence of an added aromatic hydrocarbon, and the second steaming step is conducted in the presence of a neutralizing agent.

8. A method in accordance with claim 7 in which the unreacted and added aromatic hydrocarbons are xylenes, and the neutralizing agent is sodium carbonate.

9. A method in accordance with claim 7 in which water is present in the first steaming step.

10. A method in accordance with claim 1 in which steam is introduced for a period of time at least sufficient to raise the temperature of said crude reaction product to at least 210° F.

11. A method in accordance with claim 1 in which the steam is introduced in the presence of an alkaline reagent, and the distillation under subatmospheric pressure is a flash distillation.

12. A method in accordance with claim 11 in which the alkaline reagent is sodium carbonate and the flash distillation includes a residence time of about 0.05 to about 5 minutes, a pressure of about 0.5 mm. to about 50 mm. Hg and a temperature of about 350° F. to about 450° F.

References Cited

UNITED STATES PATENTS

| | | | |
|---|---|---|---|
| 3,000,859 | 9/1961 | Mirviss et al. | 260—67 |
| 3,178,393 | 4/1965 | Brandt et al. | 260—67 |
| 3,337,422 | 8/1967 | Colton | 203—36 |

WILBUR L. BASCOMB, Jr., *Primary Examiner.*